(12) United States Patent
Mandler et al.

(10) Patent No.: US 8,685,292 B2
(45) Date of Patent: Apr. 1, 2014

(54) METHOD FOR MANUFACTURING OPHTHALMIC LENSES USING CIRCULAR BLANKS

(75) Inventors: Roland Mandler, Heuchelheim (DE); Walter Danhardt, Roanoke, VA (US); Dan Riall, Roanoke, VA (US); Marc Silva, Roanoke, VA (US)

(73) Assignee: Essilor International (Compagnie General d'Optique), Cedex (FR)

( * ) Notice: Subject to any disclaimer, the term of this patent is extended or adjusted under 35 U.S.C. 154(b) by 820 days.

(21) Appl. No.: 10/569,762

(22) PCT Filed: Aug. 20, 2004
(Under 37 CFR 1.47)

(86) PCT No.: PCT/IB2004/002721
§ 371 (c)(1),
(2), (4) Date: Mar. 15, 2007

(87) PCT Pub. No.: WO2005/018919
PCT Pub. Date: Mar. 3, 2005

(65) Prior Publication Data
US 2007/0229756 A1    Oct. 4, 2007

(30) Foreign Application Priority Data
Aug. 23, 2003  (DE) .................. 103 38 893

(51) Int. Cl.
*B29D 11/00* (2006.01)
*G02B 3/00* (2006.01)
*G02C 7/02* (2006.01)
*G02C 3/00* (2006.01)
*G02C 7/00* (2006.01)

(52) U.S. Cl.
USPC ........... 264/1.32; 264/1.37; 264/2.5; 264/2.7; 351/159.01; 351/159.7; 351/159.73; 351/159.74; 351/159.75

(58) Field of Classification Search
USPC .................. 264/1.1–2.7; 351/159.01–159.81
See application file for complete search history.

(56) References Cited

U.S. PATENT DOCUMENTS

| 3,773,868 A |   | 11/1973 | Bronstein .................. 264/1 |
| 4,080,709 A | * | 3/1978  | Poler ...................... 29/412 |
| 4,104,339 A | * | 8/1978  | Fetz et al. ................ 264/1.1 |
| 4,307,046 A |   | 12/1981 | Neefe |

(Continued)

FOREIGN PATENT DOCUMENTS

| DE | 40 03 002 | 5/1991 |
| DE | 19524391 | 1/1996 |

(Continued)

OTHER PUBLICATIONS

European Search Report for European Application EP04769153, issued on Feb. 2, 2010 (2 pages).

(Continued)

*Primary Examiner* — Christopher Schatz
*Assistant Examiner* — Matthew Hoover
(74) *Attorney, Agent, or Firm* — Cozen O'Connor

(57) ABSTRACT

For manufacturing ophthalmic lenses and other optical form bodies made of plastic material, plastic form parts are used which are made by non-cutting shaping and are then further worked by mechanical production steps. Said plastic form parts are circular blanks (1) made of two different plastic materials which are firmly joined to each other. Thereby, an interior lens element (2) that consists of a high-quality material is concentrically surrounded by a ring fixture (3) which consists of a low priced material. Either surface of the lens element (2) may feature any given geometry. During mechanical working, the ring fixture (3) is used for mounting as well as for depositing and, in addition, for stabilizing the workpiece (9). For this reason it is partially maintained throughout the mechanical working and is cut off at the end only.

20 Claims, 6 Drawing Sheets

(56) References Cited

U.S. PATENT DOCUMENTS

Figure 3A:
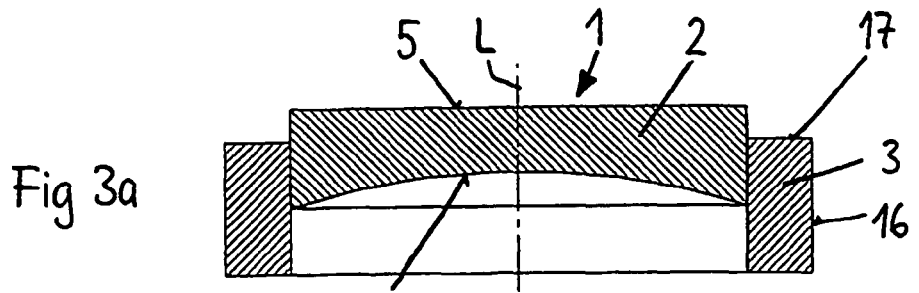

| | | | |
|---|---|---|---|
| 4,457,880 A | 7/1984 | Neefe | 264/1.4 |
| 4,562,018 A | 12/1985 | Neefe | 264/2.7 |
| 4,642,439 A | 2/1987 | Miller et al. | |
| 4,701,288 A | 10/1987 | Cook et al. | |
| 4,856,234 A * | 8/1989 | Goins | 451/42 |
| 5,582,778 A * | 12/1996 | Sherwood et al. | 264/1.7 |
| 5,805,336 A * | 9/1998 | Dalzell et al. | 359/487.02 |
| 2003/0022610 A1* | 1/2003 | Simke et al. | 451/384 |
| 2006/0163760 A1* | 7/2006 | Jensen et al. | 264/1.31 |

FOREIGN PATENT DOCUMENTS

| | | |
|---|---|---|
| DE | 20116824 | 3/2002 |
| DE | 10036158 | 5/2002 |
| JP | 59078818 | 5/1984 |
| JP | 61-270062 | 11/1986 |
| JP | 2000-258732 | 9/2000 |
| JP | 2001-054862 | 2/2001 |
| JP | 2003334784 | 11/2003 |
| WO | WO0208131 | 1/2002 |

OTHER PUBLICATIONS

English translation of Notice of Reasons for Rejection dated Feb. 22, 2011 from the Japanese Patent Office in corresponding JP Application 2006524449.

* cited by examiner

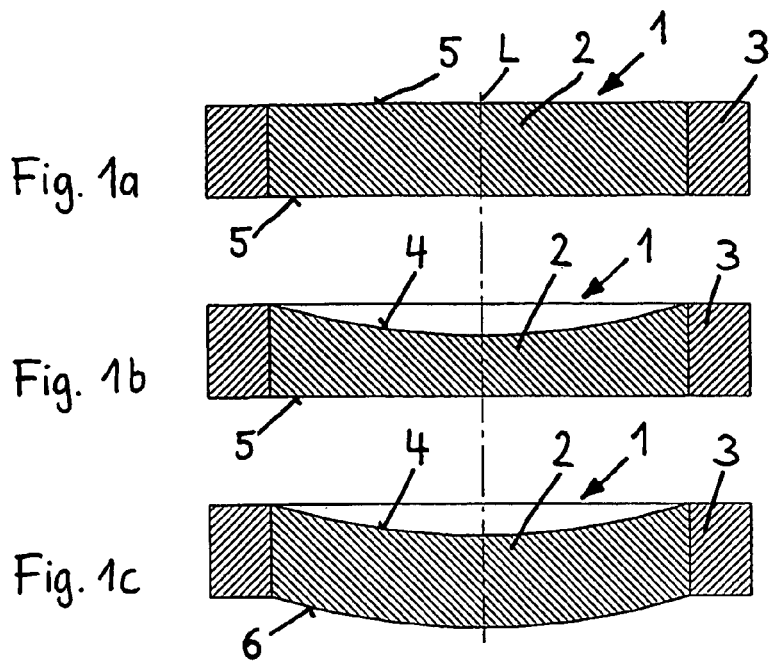
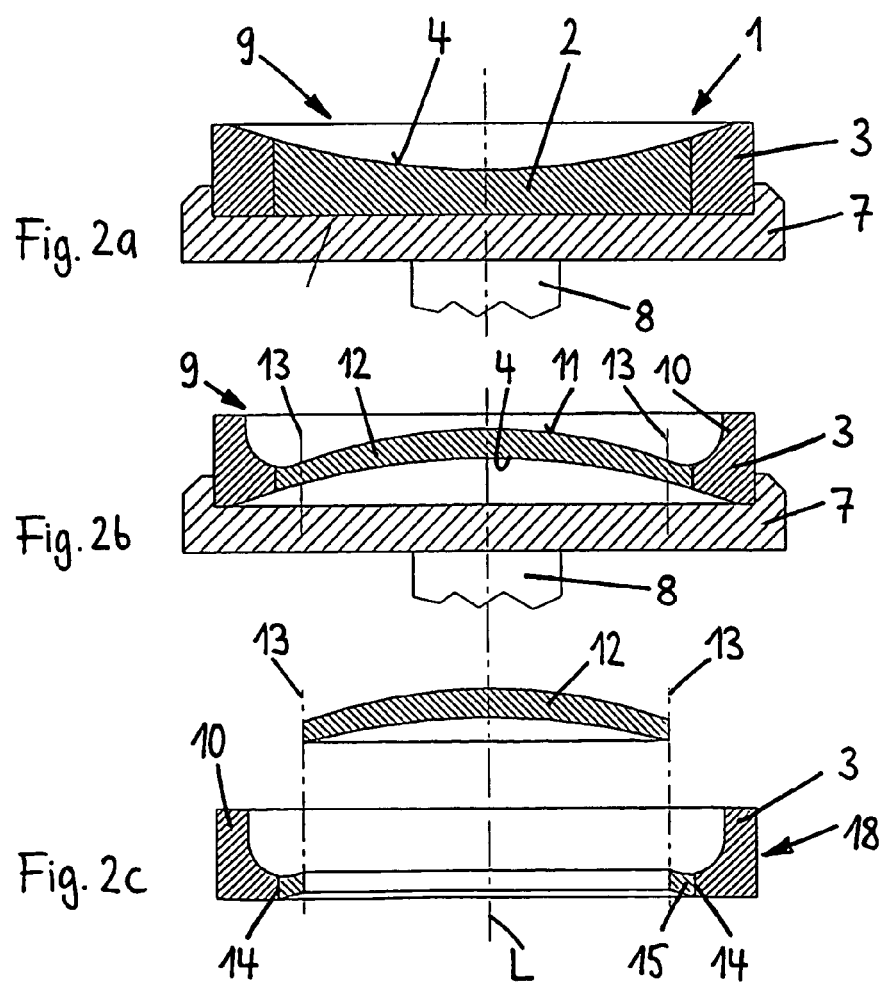

METHOD FOR MANUFACTURING OPHTHALMIC LENSES USING CIRCULAR BLANKS

PRIORITY CLAIM

This is a U.S. national stage of application No. PCT/IB2004/002721, filed on Aug. 20, 2004. Priority is claimed on patent application No. 103 38 893.1 filed in Germany on Aug. 23, 2003.

The invention relates to a method for manufacturing ophthalmic lenses, more commonly known as spectacle lenses. The invention further relates to circular blanks for manufacturing ophthalmic lenses and other form bodies made of plastic material.

In any machining process, the fundamental process elements are the cutting tool and the work holding fixture. In form machining of plastic spectacle lenses, work holding is particularly important because lenses are easily deformed when subjected to external forces.

Therefore, the work holding method must basically
  accurately locate the work piece,
  prevent any movement of the work piece during machining and
  prevent any strain on the work piece due to cutting and clamping forces.

It is well known to optimize the thickness of a spectacle lens in order to minimize its weight. In this optimization process, the thickness in the center of a plus powered lens is reduced against the thickness remaining at the edge of the lens which must fit a given lens frame. In case of minus powered lenses the thickness in the center is reduced to a minimum irrespective of the edge, just to ensure the mechanical stability of the lens.

This so-called thickness optimization causes the following problems:
  During surface machining, the edge of the lens is cut. Therefore, the outside diameter of the spectacle lens is unsuited for clamping.
  Due to the various shapes and sizes of the lens frames the edge of each lens after machining is not circular any more. For further processing, special mounting devices and manufacturing methods are required as well as a plurality of different working tools.
  While the blank is machined, the rigidity of each lens decreases due to the thickness optimization and the used plastic material.

To ease these problems, DE-A1-40 03 002 for example describes a blocking method for manufacturing spectacle lenses. A block or handle is bonded to the lens surface using wax, low-melting alloy or other removable adhesives. The block provides the datums for accurately fixing the lens in a cutting machine. The block is then clamped with sufficient pressure so as to resist any cutting forces caused by machining.

This type of work holding has the following disadvantages:
  It is difficult to accurately place the block according to the optical characteristics of the lens.
  The optical surface must be coated with a film for protection against the adhesive (additional operation).
  The curing process (shrinkage) of the adhesive material will cause deflection of the lens.
  The block permits only machining of one side of the lens at a time.
  The block and protective film must be removed from the lens later (subsequent process).

Other methods propose radial clamping the lens on its outside diameter (periphery), e.g. directly in a chucking device that squeezes the lens blank. In this type of system, the lens itself must provide the datums for accurate fixturing in the cutting machine.

This type of work holding has the following disadvantages:
  The pressure from the clamping chuck (needed to resist the cutting forces) causes deformation of the work piece whereby the optical properties are affected.
  Normal lens blanks are not particularly suited for accurate datums. Normally, they are not sufficiently round, nor have they some feature that could be used for indexing.
  Since the lens blanks come in many different sizes and shapes, direct radial clamping does not lend itself to automation very well (robot tooling must work on many different sizes and shapes of lens blanks).
  Plus powered lenses have very thin edges which are—difficult to locate, to clamp and to provide clearance for machining.

To remedy these deficiencies, US-A1-2003/0022610 describes a method of manufacturing spectacle lenses using molded round blanks having a diameter considerably larger than the diameter of the spectacle lenses to be produced. Each blank is clamped on its outside diameter and is machined on a first side, preferably on a convex front side. Thereafter the semi-finished lens is cut out from the lens blank approximately along its definite outer contour, for example using a laser tool. The cut-out part is then joined, with an axial offset, to the remaining edge portion which serves as a ring fixture or a clamping portion for the subsequent machining operations.

This type of work holding has the following disadvantages:
  Cutting a semi-finished lens and controlling axial displacement relative to the edge part with subsequent welding of both components requires an elaborate and very expensive special machine having laser devices. Due to the additional operations, the production process becomes highly expensive, too.
  The twofold cutting and the welding of both components result in finished lenses that are under considerable permanent thermal tension. Many of the plastic materials used, however, are quite vulnerable to thermal tensions and react after some time, showing crack initiation in the rim region. This is unacceptable and constitutes a great disadvantage of the procedure.
  Another shortcoming is that in cutting the finished lens, the edge portion of the workpiece is scrapped as waste. Because expensive plastic materials are required for the production of spectacle lenses, the material expenditures are high.

It is an object of the present invention to provide a method for manufacturing spectacle lenses within a work holding fixture suited to prevent any strain on the work piece due to cutting and clamping forces. It is another object of the invention to reduce production cost. Furthermore, the lens blank should be reproducible and accurately placeable according to the optical characteristics of the lens. No added operations, coatings for example, should be required. The work fixture is to permit machining of both sides of the lens at a time.

According to the invention, the procedure for manufacturing lens distinguishes over the prior art in that the plastic shaped parts (circular blanks) consist of two different materials, one high-quality material in the center and one less expensive material in the rim region. The above mentioned increase in diameter is thus created by means of an outer plastic ring made of less expensive material.

For reasons of linguistic simplification in the following context, plastic shaped parts are referred to as [plastic] circular blanks. These may be blanks (both sides being without optical quality) or semi-finished parts (one side having optical quality). The plastic circular blanks can be finished ones without a protruding structure at the rim, or they may include a shaped rim that protrudes from the surface.

But in any case, the circular blanks are made of two different plastic materials whereby the inner central region consists of high-quality transparent plastic suitable for the manufacture of a lens. This inner central region is hereinafter referred to as lens element. This lens element is surrounded by a plastic ring made of a less expensive plastic material and is hereinafter referred to as ring fixture.

This ring fixture is tightly joined to the lens element so that together, they compose the plastic circular blank. The ring fixture serves as a handle for mounting and depositing of the circular blanks during the manufacturing process for the spectacle lenses. Thus, it is also possible to provide for optimization of thickness during the manufacture without having to cope with the above-mentioned problems in the rim region. The ring fixture is detached, together with a narrow region of the lens element of the finished work, at the end of all important production steps only.

It is advantageous that the waste predominantly consists of low cost material and that available forms can be used for manufacturing the lens elements since they have the same diameters as is customary for the blocking-on-procedures. However, provision is also made for other diameters. Non-cutting shaping procedures comprise inter alia these: casting, injection molding, pressing, bonding and welding. Cutting shaping is meant to include inter alia the following procedures: milling, lathing, grinding, fine grinding, polishing and engraving. In the case of manufacturing plastic circular blanks, the lens element is produced first, preferably with non-cutting shaping procedures like casting or injection molding. Available forms previously manufactured in connection with other production processes are used as far as possible.

Next, the ring fixture is manufactured and connected to the lens element during the process or thereafter. There are several possibilities for these production steps:
1. The lens element is put into a suitable form whose diameter is definitely larger than that of the lens element and the ring fixture is cast around it. To this end, casting procedures are considered for which fluid hardening plastics are used, or injection molding is applied by which the plastic material is plasticized under heat supply and is injected under pressure around the lens element. With these procedures, a subsequent joining of both elements can be omitted because the ring fixture is already tightly fixed to the lens element during the manufacturing process.
2. The ring fixture is manufactured as a separate element using one of several procedures such as casting, injection molding, cutting from a hollow cylinder or the like. The ring fixture made in such a way is then connected to the lens element. Again there are several possibilities for doing this such as bonding laser welding, ultrasonic welding, etc. Any changes thereby possibly created in the rim region of the lens element are unimportant, because when afterwards the ring fixture is cut off from the finished lens, the cutting occurs within the high-quality material and the joint region is dropped out. If a small part of the high-quality material of the lens element is also cut out, that will only be an insignificantly small amount of material.

Regarding the shaping of the lens element and of the ring fixture as well as the following working on the plastic circular blank, there are again several versions.

Version I:
For the non-cutting shaping of the lens element, there are the following possibilities for the design of both surfaces: two coplanar plane faces, a plane face and a roughly pre-shaped face, two roughly pre-shaped faces, as well as a plane face or a roughly pre-shaped face combined with a second face having optical quality. In this case, the rim of the lens element also includes a cast-on marking by which the axis of the finished lens side is defined.

If the lens element of the circular blank comprises already a pre-shaped surface of optical quality prior to the mechanical working to obtain the second lens surface, its shape is calculated in such a way that the effects of both surfaces are added to the desired optical properties of the finished lens. Thus the number of required forms for manufacturing lens elements, one side of which is of optical quality, can be reduced considerably. This allows for larger jumps of diopter which are interpolated as the second side of the lens is worked. The same advantage is also achieved with the versions of the procedures IIA and IIB (see below).

The ring fixture is shaped like a shallow hollow cylinder and is of similar height as the lens element. Both parts are joined to one another and compose the plastic circular blank.

In the course of the following working steps including optimization of thickness, the circular blank is mounted at the outer rim and the lens body is worked by means of cutting procedures (milling, lathing, grinding, polishing). The working tools are used in such a way that an outer annular region of the circular blank maintains an almost unchanged thickness. To this end, the working tools are started from the center and continue along the contour of the lens to be manufactured whereupon they move backwards again in the rim region of the workpiece (worked-on plastic circular blank) so that the outer annular region mentioned is worked. However, the mechanical working may also begin in the rim region and move on to the center.

During the entire manufacturing process, this annular region is available for mounting and depositing the workpiece. Due to the annular region, mechanical stability of the manufactured lens is assured, too, which is a great advantage in view of the high working pressures caused by the tools. An unallowable deformation of the lens element caused by the cutting forces will not take place due to the supporting function of the annular region.

Owing to the greater diameter of the plastic circular blank and the special mode of controlling the working tool, it can be avoided to unduly cut the outer periphery of the workpiece in the course of optimizing the thickness during the mechanical working, whereby mounting at the outer periphery rim would become impossible.

At the end of all working steps, i.e. following the coating and marking, the actual lens is cut out of the center of the workpiece. The annular region and shaped rim, respectively, of the workpiece is mounted to the workpiece spindle of a milling machine, and the inner contour of the lens is cut by means of an end mill of small diameter. Other procedures may also be employed for cutting out. For example, a waterjet or a laser may be used.

The contour of the section rim can (with machining allowances) completely or roughly conform with the shape of a lens frame although other contours are possible, too, e.g. a circle form. Cutting is carried out at the rim region of the lens element in order that the connective portion between the lens element and the ring fixture is cut off the lens body in any case.

Because the ring fixture is made of another kind of plastic, the cut material of the rim region and the produced piece of waste consists chiefly of that cheaper material and only a very small portion is of the high-quality lens material. The result is substantial economy regarding material costs. Further savings are obtained with procuring working tools since casting molds on hand with most of the manufacturers can be used for the manufacturing of the lens element.

Version II:

The lens element is always manufactured in such a manner that a plane face or a roughly pre-shaped face is combined with a second face already provided with optical quality. A marking is also provided on the lens element for defining the axis of the lens side which is finished by the casting process. Here, the ring fixture is ring-shaped such that the cross-sectional areas are of rectangular or trapezoidal shapes. However, other cross-sectional forms are also envisaged. The two parts (lens element and ring fixture) are joined to one another and together they compose the circular blank including the shaped rim in such a manner that the ring fixture protrudes at that side beyond the lens element which has the optical quality surface. So it constitutes the shaped rim there. Since this side of the plastic circular blank will not have to be worked any more, the protruding fixture or shaped rim will not impede further working. The other side of the plastic circular blank (plane or roughly pre-shaped) can be worked up to the rim region without obstructions, since mounting is effected via the shaped rim at the other side of the plastic circular blank.

If the concave rear side of the lens element is of optical quality and the shaped rim is protruding there, version IIA is concerned. On the other hand, if the convex front side of the lens element is of optical quality and the shaped rim is protruding there, version IIB is concerned.

During the following working steps comprising thickness optimization, the plastic circular blank outer portion (periphery) is mounted via the shaped rim and that side of the lens is worked which still lacks optical quality. To this end, cutting procedures (milling, lathing, grinding, polishing) are applied with the working tools being particularly easy to operate because there are no limitations to their movements which might be caused by the design of the workpiece. Thus it is also possible and technologically advantageous to move the working tools (if reasonable) beyond the rim of the workpiece.

During the cutting procedure, this shaped rim is substantially maintained and it is available at all working steps for mounting and depositing of the workpiece. A stabilization of the manufactured lens is also achieved by the shaped rim which is again a great advantage in view of the high working pressures caused by the working tools. An unallowable deformation of the lens element caused by the cutting forces is prevented by the supporting function of the shaped rim.

The larger diameter of the plastic circular blank and the available shaped rim ensure that during the mechanical working, the outer periphery the workpiece will lose height only to a minor extent within the optimization of thickness. Enough material will remain at the rim region for mounting at the outer periphery or shaped rim.

At the end of all working steps, the actual lens body is cut out of the center of the workpiece, as already mentioned with reference to version I. The same advantages of material and working tool cost savings result.

Conventional casting and injection molding machines and working tools can be used for effecting the procedures according to versions I and II. The techniques required for connecting the lens element and the ring fixture are available as well. Likewise, conventional working machine and tools can be employed for cutting and polishing the workpieces.

CNC-controlled machines and the appropriate special working tools are beneficial for cutting and polishing according to versions I and IIA. As to version IIB, simpler working machines may be used.

Figure 3B:
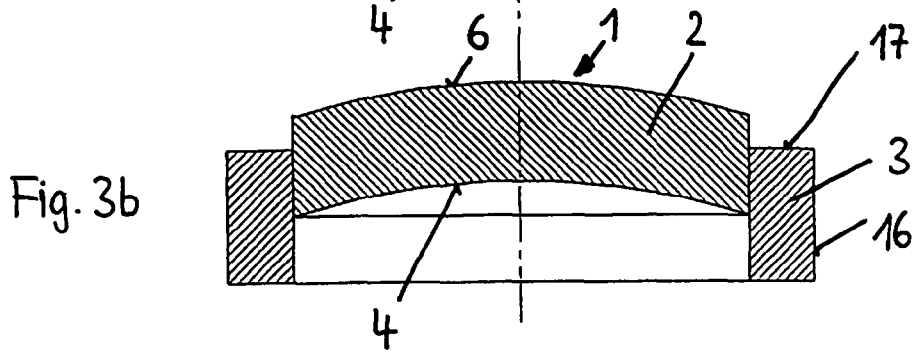
Figure 4A:
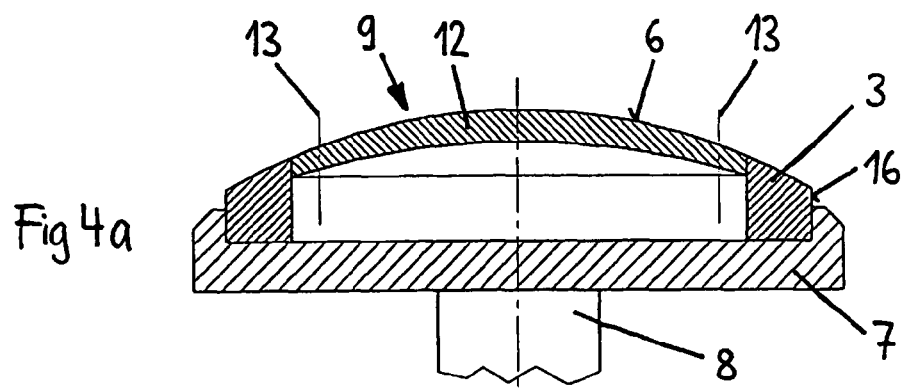
Figure 4B:
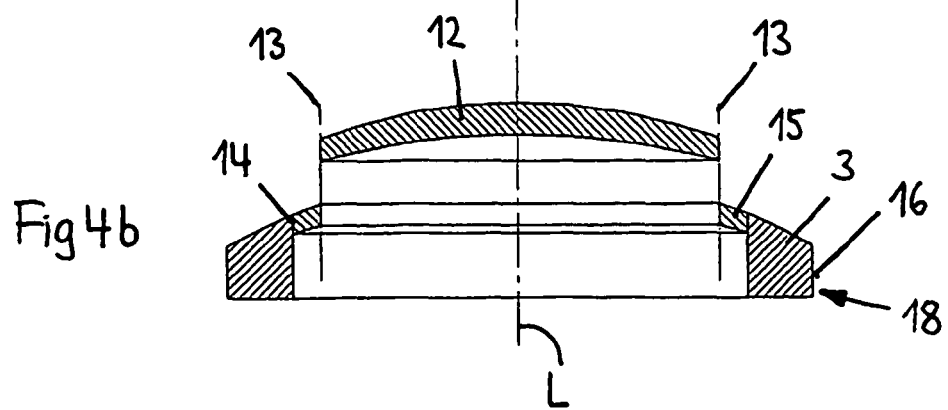
Figure 5A:
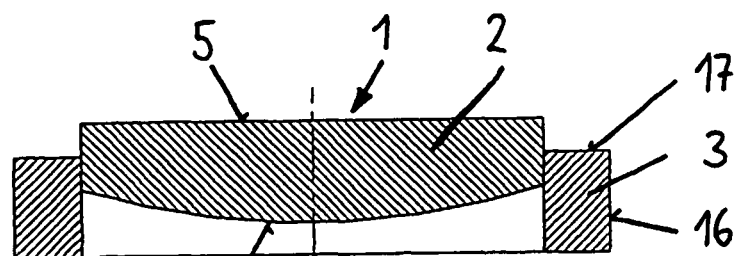
Figure 5B:
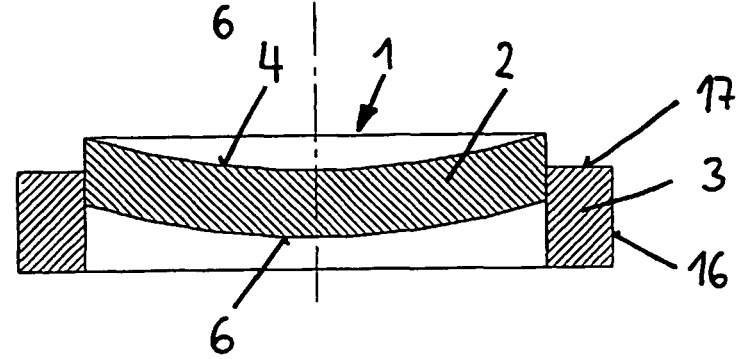
Figure 6A:
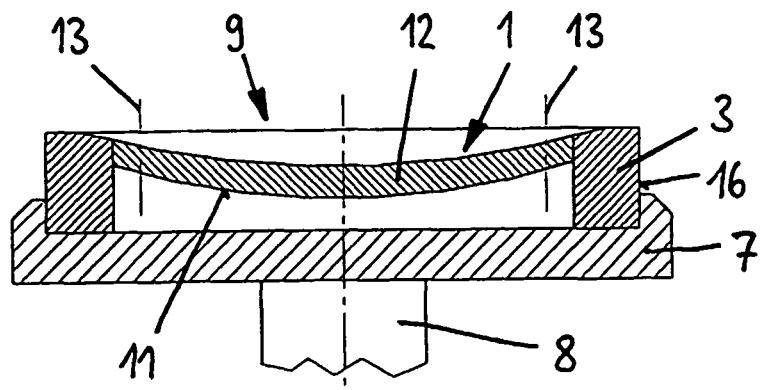
Figure 6B:
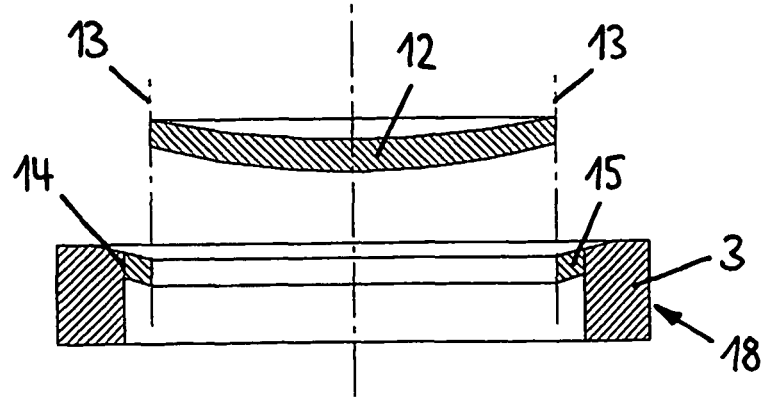
Figure 7:
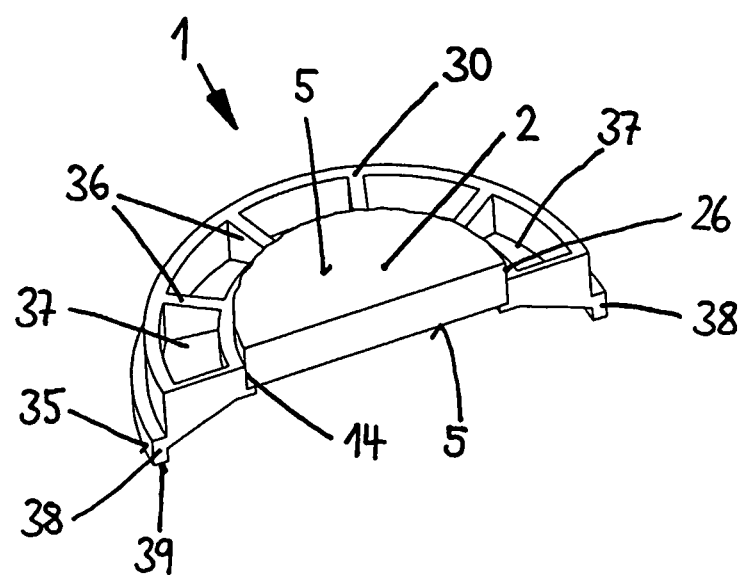
Figure 8A:
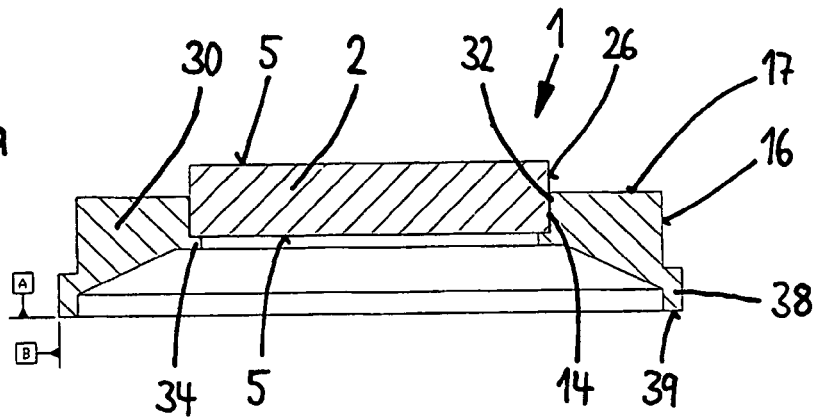
Figure 8B:
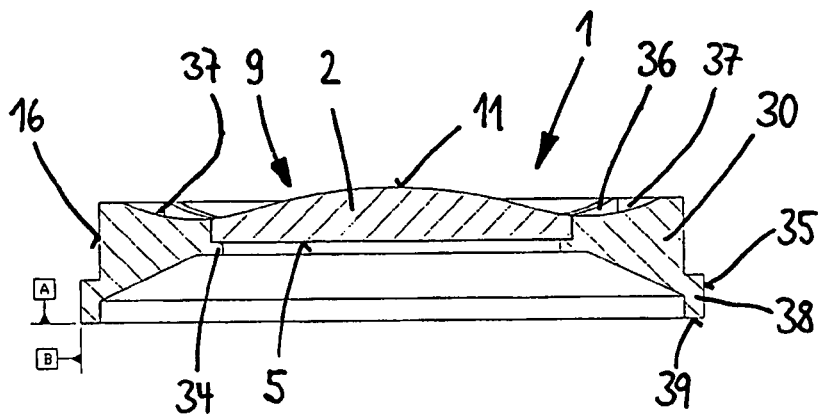
Figure 8C:
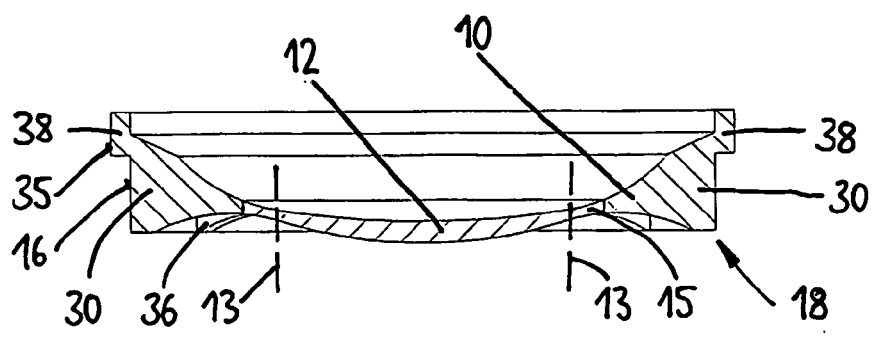
Figure 9A:
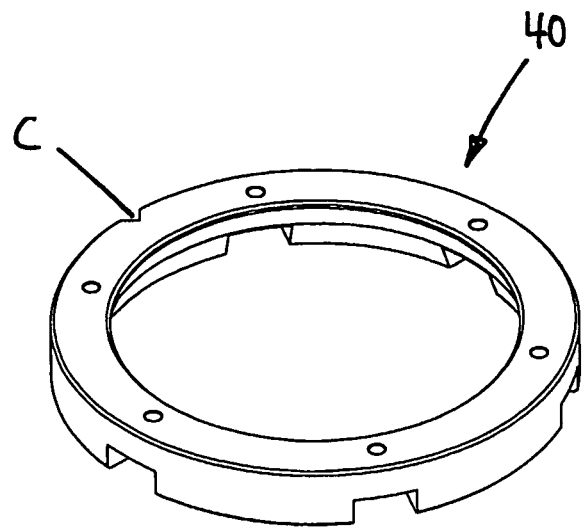
Figure 9B:
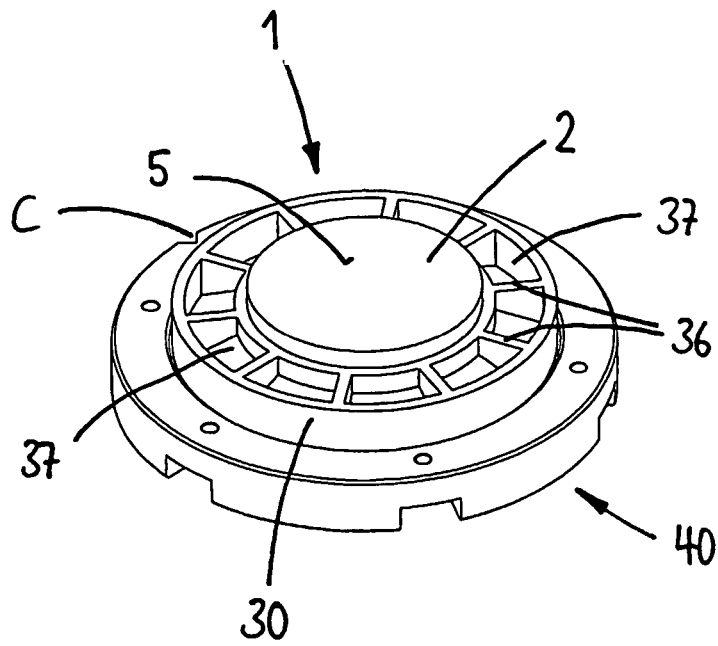

Further features, details and advantages of the invention will be evident from the wording of the claims and from the following description of embodiments with reference to the drawings wherein:

FIGS. 1a to 1c show different plastic circular blanks,

FIGS. 2a to 2c show the circular blanks of FIG. 1a to 1c and their further processing, FIGS. 3a and 3b show other embodiments of circular blanks, FIGS. 4a and 4b show the circular blanks of FIGS. 3a and 3b and their further processing, FIGS. 5a and 5b show further embodiments of circular blanks, FIGS. 6a and 6b show the circular blanks of FIGS. 5a and 5b and their further processing, FIG. 7 shows another embodiment of a circular blank, FIGS. 8a to 8c show the circular blank of FIG. 7 and its further processing and FIGS. 9a and 9b show yet another embodiment of the invention.

FIGS. 1a to 1c illustrate three different embodiments of plastic circular blanks 1, as manufactured by non-cutting shaping procedures. FIGS. 2a to 2c show schematically the manufacturing process.

FIG. 1a concerns a circular blank 1 having a lens element 2 that consists of a plane cylinder, with the front and rear sides comprising a plane face 5 each. This lens element 2 is made of a high-quality transparent plastic material having a high refraction index, which is suitable for the manufacturing of spectacle lenses and is accordingly expensive. The lens element 2 is manufactured by non-cutting shaping procedures such as casting, injection molding, pressing, etc.

A ring fixture 3 has the shape of a plane hollow-cylinder whose cross-section forms rectangles. Its height corresponds to the height of the lens elements 2. It consists of a cheap plastic having properties which match those of the lens element 2 so that joining these components is possible without problems. Although the ring fixture 3 can be manufactured by non-cutting shaping, it is also possible to cut it off a precast hollow cylinder plastic tube so that large quantities of these ring fixtures 3 can be produced in rapid sequences.

The finished ring fixture 3 is then joined to the lens element 2 whereby the circular blank 1 is created. For such bonding, adhesive processes are considered using liquid plastic, which are hardened e.g. by means of ultraviolet light or an added hardener. However, welding procedures are also contemplated with the heat required being supplied, for example, by laser or ultrasound technologies. Other welding procedures may be used, too.

Moreover, it is provided that the lens element 2 is put into a form and the ring fixture 3 is molded around the lens element 2 by casting or injection molding procedures. Since in this case the material of the ring fixture 3 is liquid, especially as a liquid plastic or heated thermoplastic material, this casting procedure will bring about solid adhesion between the lens element 2 and the ring fixture 3.

FIG. 1b concerns a circular blank 1 with a lens element 2 one side of which is already pre-shaped into a concave surface 4 by non-cutting shaping. The concave surface 4 may be roughly pre-shaped or may be a surface of optical quality which already forms the concave rear side of the lens. The other side of the plastic circular blank 1 consists of a plane face 5. Manufacture of the ring fixture 3, choice of materials and production processes are the same as already explained with reference to FIG. 1a.

FIG. 1c shows a circular blank 1 with a lens element 2 both sides of which have already been pre-formed as a concave surface 4 and as a convex surface 6, respectively, by non-cutting shaping procedures. These may be roughly pre-shaped surfaces or it may be provided that one of the two surfaces, preferably the concave surface, is already of optical quality and thus is the already finished side of the lens. Manufacture of the ring fixture 3, choice of material and production processes are the same as explained above with reference to FIG. 1a.

FIG. 2a illustrates how a circular blank 1 shaped according to FIG. 1b is put into a mounting tool 7 fixed to a workpiece spindle 8 of a machine tool (not shown). The concave surface 4 of optical quality is made by means of a conventional milling, lathing, grinding and polishing procedure, with the ring fixture 3 only slightly cut. The concave surface 4 of the lens element 2 is the finished rear side of the spectacle lens 12.

Since the designation plastic circular blank 1 strictly speaking applies only to an unworked component, the pre-worked plastic circular blank 1 is hereinafter also termed workpiece 9.

According to FIG. 2b, the workpiece 9 has been flipped by 180° and inserted again into the same mounting tool 7. The concave surface 4 of optical quality points now towards the mounting tool 7 which again is fixed to the workpiece spindle 8 of a machine tool. By the cutting procedures mentioned, the convex surface 11 was manufactured in optical quality whereby the region of the lens element 2 already is the finished front side of the spectacle lens 12.

By appropriate operating the working tool, the annular region 10 was pre-worked, so as to serve during the following working steps for mounting and depositing. It chiefly consists of the cheaper material of the ring fixture 3. This annular region 10 also serves as a support of the working piece 9 in the thin rim region.

The annular region 10 could be manufactured only by moving the working tools upwards in the rim region of the workpiece 9 whereby the tools were prevented from cutting into the outer periphery of the workpiece 9 and possibly of the mounting tool 7 as well. This would have happened if the working tools had continued to follow the contour of the convex surface 11.

The annular region 10 consists mainly of the cheap material of the ring fixture 3 and only to a minor part of the high-quality material of the lens element 2.

Later on, separation of the actual lens 12 from the annular region 10 is effected along a contour which is marked by two section lines 13 in the sectional view. This contour corresponds to the provided lens frame either exactly or with a size allowance so that the optician can adapt it.

In FIG. 2c, the lens 12 and annular region 10 are seen as already separated from one another along a contour which, according to the section lines 13, is given by the shape of a lens frame.

The lens 12 consists entirely of the high-quality material, whereas the waste portion 18 consists mainly of the cheaper material of the ring fixture 3 and only to a minor part of the narrow rim region 15 of the lens element 2. This results in considerable material savings.

Since for separating the lens 12 from the workpiece 9, the cut is completely carried out within the material of the lens element 2, the joint 14 is located between that and the ring fixture 3 in the waste portion 18. Therefore, this interference zone cannot affect the spectacle lens 12.

The advantage of this version I of the procedure is that both sides can be worked on and thus spectacle lenses 12 can be made with whatever shape according to prescription. Storage expenses are relatively low, too, because few plastic circular blanks 1 with finished surface have to be stored. Besides, material costs are lower due to the rim region being of less expensive material, and further savings result from the fact that available form tools can be used.

In FIGS. 3a and 3b illustrates two different embodiments of the circular blank 1 made by means of non-cutting shaping. FIGS. 4a and 4b show schematic manufacturing sequences.

Inter alia, FIG. 3 show two different embodiments of the plastic circular blanks having shaped rims 16, made by non-cutting shaping. In this version IIA, the concave surface 4 must at any rate have been provided with optical quality already because it is not accessible any more for mechanical working.

FIG. 2a illustrates a plastic circular blank 1 having a shaped rim 16 formed by the ring fixture 3. The shaped rim 16 considerably protrudes beyond the lens element 2, which has production related advantages during the cutting procedure. To one side of the lens element 2, a concave surface 4 of optical quality has to be pre-formed because, as mentioned, it is not freely accessible for mechanical working due to the protruding shaped rim 16.

This concave surface 4 already is the finished rear side of the lens 12. The other side of the lens element 2 comprises a plane face 5. It is seen that the shaped rim 16 formed by the ring fixture 3 is slightly displaced downwards, together with its top side 17, relative to the plane face 5. Other embodiments are also contemplated in which the top side 17 and the plane face 5 are in one plane.

Manufacture of the ring fixture 3, the choice of material and the manufacturing techniques are the same as already mentioned with reference to FIG. 1a.

FIG. 3b shows a plastic circular blank 1 having a shaped rim 16 with a lens element 2 of which both sides have already been pre-formed by way of a concave surface 4 and a convex surface 6, respectively, through non-cutting shaping.

The convex surface 6 is a roughly pre-shaped face which still has to be mechanically worked. The concave surface 4, however, must at any rate already have optical quality, created by non-cutting shaping. This is necessary because the concave surface 4 is not accessible any more for mechanical working due to the protruding shaped rim 16.

Referring to FIG. 3b, the top side 17 of the shaped rim 16 formed by the ring fixture 3, is again slightly displaced downwards relative to the convex surface 6. However, other embodiments are also contemplated.

Manufacture of the ring fixture 3, the choice of material and of the manufacturing techniques are the same as mentioned above with reference to FIGS. 1a to 1c.

FIG. 4a shows a workpiece 9 which originated from the originally shaped plastic circular blank 1 according to FIG. 3b by mechanical working. The workpiece 9 is inserted into a mounting tool 7 connected to a workpiece spindle 8 of a machine tool (not illustrated). The convex surface 6 was manufactured with optical quality by a conventional procedure such as milling, lathing, grinding and polishing, the shaped rim 16 formed by the ring fixture 3 being cut only slightly. The convex surface 6 of the lens element 2 comprises the finished front side of the lens 12. Thus both surfaces of the lens 12 are of optical quality.

Later on, separation of the actual lens 12 off the shaped rim 16 is effected along a contour which is marked by two the section-lines 13 in the sectional view of FIG. 4a. This contour corresponds to the provided lens frame either exactly or with a size allowance, for adaptation by an optician.

FIG. 4b shows the lens 12 already cut off from the workpiece 9 along a contour according to the section boundaries 13 given by the shape of a lens frame.

The lens 12 consists entirely of high-quality material whereas the waste portion 18 is formed by the narrow rim region 15 of the lens element 2 and the ring fixture 3. Thus the waste 18 is made up chiefly of the cost-effective material of the ring fixture 3 and only to a small part of the material of the lens element 2. Considerable material expenditures will be saved in this way.

Since the cut separating the lens 12 out of the workpiece 9 runs completely within the material of the lens element 2, the joint 14 is located between this and the ring fixture 3 or the shaped rim 16, respectively, in the waste portion 18. This interference zone cannot affect the lens 12.

The advantage of this procedure version IIA is that the convex surface 6 is very easily accessible for mechanical working whereby production cost is saved. Besides material costs are lower because the rim region is made of cheaper material. Other savings result from the fact that available form tools can be used with the machine tools.

In FIGS. 5a and 5b, two different embodiments are illustrated of the circular blank 1 made by non-cutting shaping. FIGS. 6a and 6b show a schematic manufacturing sequence.

Inter alia, FIG. 5 shows two different embodiments made by non-cutting shaping of the plastic circular blanks having shaped rims 16. In this version IIB, the convex surface 6 must be made with optical quality already because it is not freely accessible any more for mechanical working.

FIG. 5a shows a plastic circular blank 1 having a shaped rim 16 surrounding the lens element 2 and formed by the ring fixture 3. The one side of the lens element 2 has a convex surface 6 while the other side is formed by a plane face 5.

Referring to FIG. 5a, the top side 17 of the shaped rim 16 is slightly displaced downwards relative to the plane face 5 in view of production relevant reasons (less cutting scrap). Other embodiments are also contemplated wherein the top side 17 and the plane face 5 are in one plane. The shaped rim 16 protrudes considerably beyond the lens element 2 at the side of the convex surface 6, which also brings about advantages in the cutting procedure.

As mentioned, the lens element 2, pre-formed by non-cutting shaping, already has on one side a convex surface 6 which in this case already must have optical quality because due to the protruding shaped rim 16, it is not freely accessible for mechanical working any more. Thus this convex surface 6 already presents the finished front side of the lens 12. Concerning the manufacture of the ring fixture 3, the choice of material and of the production techniques, the statements mentioned with reference to FIGS. 1a to 1c apply here as well.

FIG. 5b also illustrates a plastic circular blank 1 having a shaped rim 16 with both sides being already pre-worked by non-cutting shaping to yield a concave surface 4 and a convex surface 6, respectively.

Referring to FIG. 5b, the top side 17 the shaped rim 16 formed by the ring fixture 3 is again displaced slightly downwards relative to the concave surface 4 for production relevant reasons. However, other embodiments are also contemplated. The shaped rim 16 protrudes considerably beyond the lens element 2 at the convex side, resulting in production advantages with the cutting procedure.

The concave surface 4 is a roughly pre-shaped face which still has to be worked mechanically. However, the convex surface 6 produced by non-cutting shaping must already be of optical quality at any rate because due to the protruding shaped rim 16, there is no free access for working any more. Again for the manufacture of the ring fixture 3, the choice of material and of the manufacturing techniques, the same applies as already mentioned with reference to FIGS. 1a to 1c.

FIG. 6a illustrates a workpiece 9 which was formed from a circular blank 1 originally shaped according to FIG. 5b by mechanical working the concave surface 4. The workpiece 9 is put into the mounting tool 7 connected to the workpiece spindle 8 of a working machine (not shown).

The concave surface 4 is manufactured with optical quality by a convention procedure such as milling, lathing, grinding and polishing, the shaped rim 16 formed by the ring fixture 3 being cut only slightly. The concave surface 4 of the lens element 2 presents the finished rear side of the lens 12 whose surfaces, therefore are both available in optical quality.

The separation of the actual lens 12 off the workpiece 9 occurs later on along a contour marked by two section lines 13 in the views of FIGS. 6a and 6b. This contour corresponds to a given lens frame either exactly or with a size allowance so that the optician can adapt it.

FIG. 6b shows the lens 12 as already separated from the workpiece 9 by cutting along a contour according to the section boundaries 13 determined by the shape of a lens frame.

The lens 12 consists entirely of high-quality material, whereas the waste portion 18 is formed by the narrow rim region 15 of the lens element 2 and the ring fixture 3 or the shaped rim 16, respectively. For this reason, the waste part 18 consists chiefly of the cheaper material of the ring fixture 3, and only to a small part of the material of the lens element 2, whereby considerable material expenditures are saved.

Since the cut for separating the lens 12 from the workpiece 9 was completely carried out within the material of the lens element 2, the joint 14 is located between this and the ring fixture 3 in the waste portion 18 so that this interference zone cannot affect the lens 12.

The advantage of the procedure as per version IIB is that the concave surface 4 is very easily accessible for mechanical working, resulting in production economy and also in less material costs (rim region is made of less expensive material). Other savings come about by the working tools, as available shaping tools can be used.

FIG. 7 shows another embodiment of a circular blank 1 according to the invention including a lens element 2 and a ring fixture 30 having a recess 32 that forms a flange 34 near the bottom which supports the lens element 2 inserted into the ring fixture 30. It is bonded to the outer diameter (periphery) 26 of the lens element 2 by an adhesive and is made of a low-cost plastic material adapted to be readily machined in the lens making process, without damage to tools or contamination to swarf.

The function of the flange 34 is to simplify the assembly process, setting the height of the lens element 2 relative to the body of the ring fixture 30. If the flange 34 were not there, the height would have to be set by a fixture of some sort. Putting the flange 34 into the ring fixture 30 eliminates the need for separate fixturing.

As shown in FIG. 7, the ring fixture 30 may be provided with radial ribs 36 and spaces 37 in-between. These ribs 36 are intended to save material volume without sacrificing component part strength and stability during the machining and polishing processes. Using an injection molding process, the ring part 30 can be manufactured at low cost.

The bottom of the ring fixture 30 has at its outer diameter 16 a collar 38 designed to allow the circular blank 1 to be gripped and clamped at the various workstations. The collar 38 is bordered by a flat annular abutment rim 39 (of given datum A) allowing stable and accurate seating of the circular blank 1 against a suitable support or mounting tool 7 of the workstation. The abutment rim is in a preferred embodiment perpendicular to the outer diameter 35 (of given datum B) of the collar 38 which is coaxial to the axis L of the circular blank 1.

In an further embodiment, the ring fixture 30 and/or the collar 38 comprises two or more diametrically opposed members (not shown) for mechanical registration (of given datums) which are separated from each other by at least one of their dimensions. This will increase the accuracy and reliability of alignment.

In a first step—illustrated in FIG. 8a—the lens element 2 is inserted into the ring fixture 30. The joint 14 between the lens 2 and the ring 30 is filled up with an adhesive, no precision being required for this assembly. The lens element 2 need not have particularly good features or a circular outside diameter. After curing, the lens element 2 assumes the accurate datums A, B of the ring fixture 30.

The circular blank 1 is loaded into the cutting machine, locating off the ring fixture datums and is clamped either radially on the outer diameter 16 of the ring 30 or clamped axially. The forces of clamping are not transmitted to the lens element 2, i.e. no stress will occur. The first surface 11 is then machined.

After first surface machining (see FIG. 8b), some of the ring fixture 30 will be consumed due to the size of the cutting tool. Enough of the ring 30 remains, however, to support the lens element 2 during subsequent operations. Next, the workpiece 9 is flipped over, re-fixtured using the same datums A, B, and is clamped as before. The second side is machined as shown in FIG. 8c.

After the second surface of the lens 2 is cut, more of the ring fixture 30 will be consumed. Depending on the frame geometry and the lens, some small portions of the ring 30 may be cut through completely. Still, enough remains to prevent any strain on the lens element 2 due to clamping forces or tool forces.

Alternatively, the ring fixture 30 may include accurate datums A, B as part of its design, or it is mounted into a rigid pallet 40 (see FIGS. 9a, 9b) that has its own accurate datums C and is reusable. The ring fixture 30 will be mounted to the rigid pallet 40 using mechanical means (not shown) and utilize the pallet's datums C for cutting both front and back optical surfaces.

The work holding methods described above have the following benefits:
  precise datum features for accurate fixturing;
  allow for machining both sides of the lens (convex and concave) referencing off the same datum set—no remounting required;
  the ring fixture 30 absorbs the clamping forces from the machine's chucking system, preventing deformation of the lens;
  allow for thin edges and non round lens shapes to be cut;
  no precision is required at the bonding step since both surfaces will be machined using the datums provided by the ring fixture 30, particularly by the collar 38;
  the deformation caused by bonding (shrinkage) is negligible because it is uniform around the outer diameter of the lens element 2, not on the lens surface;
  no surface protection is required on the lens element 2;
  the outer diameter of the ring fixture 30 can be more readily fixtured than a blocking lens which is beneficial for automation and for downstream processes such as marking, cleaning, coating, curing and inspection;
  the ring fixture 30 can be cut as part of the machining process, allowing for thinner edge geometry and non round shapes;
  after removal from cutting machine, the datums are still part of the lens assembly (circular blank 1) which is valuable for downstream processes.

In addition to the items above, there is an advantage in optical material waste. With the outside diameter chucking, the initial size of the lens blank 1 must be larger than the finished lens size to provide sufficient chuck clearance. The lens 12 cannot be cut all the way to the edge, nor can it be cut to a minimum edge thickness without interfering with the chuck.

Using the ring fixture 30 permits reduction of both blank diameter and thickness for production of same size finished lenses. This translates into less waste of high cost optical lens material.

All and any features and advantages—including design details, spatial arrangements and procedural steps—arising from the claims, the description and/or the drawings may be inventively important both per se and in most variegated combinations.

LIST OF REFERENCE SYMBOLS 1. plastic circular blank
2. lens element
3. ring fixture/handle
4. concave surface
5. plane face
6. convex surface
7. mounting tool
8. workpiece spindle
9. workpiece
10. annular region
11. convex surface
12. spectacle lens
13. section line
14. joint
15. narrow rim region
16. shaped rim/periphery
17. top side
18. waste portion
26. outer diameter/periphery
30. ring fixture/handle
32. recess
34. flange
35. outer diameter
36. rib
37. space
38. collar
39. abutment rim
40. pallet

The invention claimed is:

1. A method for manufacturing a spectacle lens made of plastic material wherein the method comprises the steps of:
  providing a plastic circular blank made by non-cutting shaping procedures, the plastic circular blank comprising:
    an interior lens element comprised of a plastic material suitable for the manufacture of a spectacle lens, the interior lens element being substantially of a size and shape suitable for the manufacture of a spectacle lens, the interior lens element having two surfaces being of an arbitrary geometry, and
    a ring fixture comprised of a plastic material different than the plastic material comprising the interior lens element, the ring fixture concentrically surrounding the interior lens element, the ring fixture being fixedly attached to the interior lens element;

mechanically working the plastic circular blank by mechanical production steps using cutting procedures selected from the group consisting of milling, lathing, grinding, polishing, and engraving, wherein during the mechanically working step, the ring fixture is available for mounting, depositing and stabilizing the plastic circular blank, the ring fixture being partially maintained during the mechanical production steps; and cutting off the entire ring fixture so as to remove all plastic material outside the periphery of said interior lens element to form a lens suitable in size and shape for use as a spectacle lens.

2. The method for manufacturing according to claim 1, wherein during non-cutting shaping, the lens element is made to obtain the same dimensions and geometries as obtained from plastic form parts by conventional blocking-on procedures, a desired enlargement of the diameter of the plastic circular blank being produced by the ring fixture put around the interior lens element.

3. The method for manufacturing according to claim 1, wherein the ring fixture is cast or injected around the interior lens element.

4. The method for manufacturing according to claim 1, wherein the ring fixture is adhered or is made using liquid plastic which is hardened by a hardener or by ultraviolet light.

5. The method for manufacturing according to claim 1, wherein the ring fixture is made of thermoplastic plastic which is heated for processing and is injected around the interior lens element.

6. The method for manufacturing according to claim 1, wherein the ring fixture is manufactured as a separate component by casting, by injection molding or by cutting-off from a hollow cylinder and is joined to the interior lens element afterwards.

7. The method for manufacturing according to claim 6, wherein adhesive means are used for joining the interior lens element and the ring fixture.

8. The method for manufacturing according to claim 6, wherein welding by a laser or by ultrasound means is used for joining the interior lens element and the ring fixture.

9. The method for manufacturing according to claim 1, further comprising reducing a thickness of the spectacle lens.

10. The method for manufacturing according to claim 1, wherein by means of mechanical working out of the ring fixture, a basic part of an annular region is formed which in the following mechanical production steps is maintained and which serves for mounting, depositing and stabilizing the plastic circular blank, the annular region consisting mainly of the material comprising the ring fixture.

11. The method for manufacturing according to claim 1, wherein two plane faces are produced as the surfaces of the interior lens element.

12. The method for manufacturing according to claim 1, wherein through use of non-cutting shaping procedures, the interior lens element is given a plane face and a pre-shaped face formed to be a concave surface or a convex surface, respectively, which are either roughly pre-shaped or are already shaped.

13. The method for manufacturing according to claim 1, wherein during manufacturing of the interior lens element by non-cutting shaping, two pre-shaped faces are formed both of which are either roughly pre-shaped or already shaped.

14. The method for manufacturing according to claim 1, wherein one side of the interior lens element is already provided with a concave or convex surface of optical quality, and the ring fixture protrudes beyond the surface of the interior lens element so as to form a shaped rim which is maintained during the following mechanical production steps and which serves for mounting, depositing and stabilizing the plastic circular blank, the shaped rim consisting of the material comprising the ring fixture.

15. The method for manufacturing according to claim 14, wherein the shaped rim protrudes from the concave surface of the interior lens element and wherein the concave surface is manufactured by non-cutting shaping so as to be already shaped.

16. The method for manufacturing according to claim 14, wherein the shaped rim protrudes from the convex surface of the interior lens element and the convex surface is made so as to be already shaped.

17. The method for manufacturing according to claim 1, wherein following the mechanical working the plastic circular blank is coated and its optical is marked, whereupon the spectacle lens is cut off from the circular blank, the cut being exclusively made within the material of the interior lens element.

18. The method for manufacturing according to claim 1, wherein a mechanical working tool, a waterjet or a laser is used for cutting the spectacle lens off from the plastic circular blank.

19. The method for manufacturing according to claim 1, wherein through the cutting of the plastic circular blank, the spectacle lens obtains an outer contour which is sized and shaped to fit into a spectacle lens frame, either exactly or with a machining allowance.

20. The method for manufacturing according to claim 1, wherein the step of cutting follows the step of mechanically working the plastic circular blank.

* * * * *